United States Patent [19]

Fletcher

[11] 4,368,370

[45] Jan. 11, 1983

[54] SWITCH ACTUATING APPARATUS FOR VIDEO DISC PLAYER

[75] Inventor: James D. Fletcher, Indianapolis, Ind.

[73] Assignee: RCA Corporation, New York, N.Y.

[21] Appl. No.: 233,708

[22] Filed: Feb. 12, 1981

[51] Int. Cl.³ .............................................. H01H 3/20
[52] U.S. Cl. .................................. 200/329; 200/331; 200/337
[58] Field of Search .............. 200/329, 337, 330, 331, 200/338, 153 V

[56] References Cited

U.S. PATENT DOCUMENTS

| | | | |
|---|---|---|---|
| 2,203,309 | 6/1940 | Schmid | 200/329 |
| 2,724,032 | 11/1955 | Coletta | 200/331 |
| 3,004,128 | 10/1961 | Mikolajeski | 200/331 |
| 4,167,659 | 9/1979 | Yamanaka et al. | 200/329 |

Primary Examiner—Willis Little
Attorney, Agent, or Firm—E. M. Whitacre; J. S. Tripoli; D. A. Kulkarni

[57] ABSTRACT

Video disc player includes a mechanism for actuating a transfer switch for selectively connecting either the antenna or the player to the television receiver.

11 Claims, 7 Drawing Figures

SWITCH ACTUATING APPARATUS FOR VIDEO DISC PLAYER

This invention generally relates to a video disc player, and more particularly, relates to an apparatus for actuating a switch in a record player.

In certain systems, picture and sound information is stored on a disc record in the form of geometric variations in a continuous spiral track disposed on the record surface. The variations in capacitance between an electrode carried by a record-engaging stylus and a conductive property of the record are sensed, and converted into signals suitable for application to a conventional television receiver for reproducing the stored information. A capacitance-type pickup system is illustratively disclosed in U.S. Pat. No. 3,842,194 (Clemens).

It is beneficial to enclose a video disc record in a caddy which comprises an outer jacket and a record retaining spine. The spine is provided with an opening in which a record is received, thereby forming a record/spine assembly. For record loading, a full caddy is inserted into the player along a pair of guide rails provided in the player. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The players is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

The player is equipped with a turntable lifting/lowering mechanism which is operated by a function lever. The function lever is selectively disposed into one of three positions—OFF, PLAY and LOAD/UNLOAD. The turntable is raised when the function lever is moved from the LOAD/UNLOAD position to the PLAY position to pick up a record disposed on the receiving pads. To transfer a turntable-supported record back to the receiving pads, the function lever is displaced from the PLAY position to the LOAD/UNLOAD position.

When the function lever is disposed in the OFF position, the television antenna terminals are coupled to the television receiver via a transfer switch provided in the video disc player. Thus, when the player is in the OFF mode, the signals at the antenna terminals bypass the player signal processing circuitry, and are fed directly to the television receiver to reproduce the broadcast signals. When the function lever is set either in the PLAY mode or in the LOAD/UNLOAD mode, the antenna terminals are isolated from the television receiver, and the signals at the output of the player signal processing circuitry are applied through the transfer switch to the television receiver to reconstruct the picture and sound information stored on the video disc.

It is desirable to employ a mechanism responsive to the operation of the function lever to set the antenna transfer switch in any one of two modes for selectively connecting either the antenna or the player to the television receiver.

The switch actuating apparatus, pursuant to this invention, comprises an actuated lever coupled to the antenna transfer switch, and subject to motion between a first position and a second position, which correspond to the two modes of the transfer switch. An actuating rod is coupled to the function lever, and is adapted to be disposed to a retracted location, an intermediate location and an advanced location in response to the disposition of the function lever in the LOAD/UNLOAD position, the PLAY position and the OFF position respectively. The switch actuating apparatus further includes a leaf spring having one end secured to the actuating rod. A detent portion is disposed on the leaf spring for releasably capturing the actuated lever as the actuating rod advances from the retracted location to the intermediate location. The actuating rod effects displacement of the actuating lever to the second position as the actuating rod is moved from the intermediate location to the advanced location. When the actuated lever occupies the second position, the player is in the OFF mode and the antenna is connected to the television receiver. The capture of the actuated lever by the detent portion of the leaf spring serves to relocate the actuated lever to the first position when the actuating rod is retracted to the intermediate location thereof. When the actuated lever is disposed in the first position, the player is in the PLAY mode and supplies signals to the television receiver. As the actuating rod is further retracted, the leaf spring is deflected to release the actuated lever from the detent portion.

Figure 1:
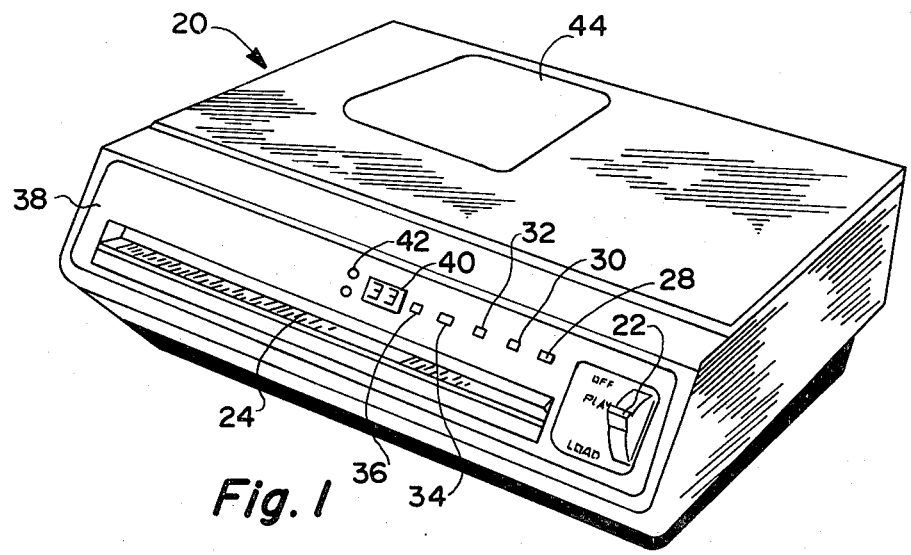
FIG. 1 is a video disc player incorporating a switch actuating apparatus in accordance with the subject invention.

Shown in FIG. 1 is a video disc player 20 incorporating a switch actuating apparatus according to the present invention. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a video disc caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 3.

Figure 2:
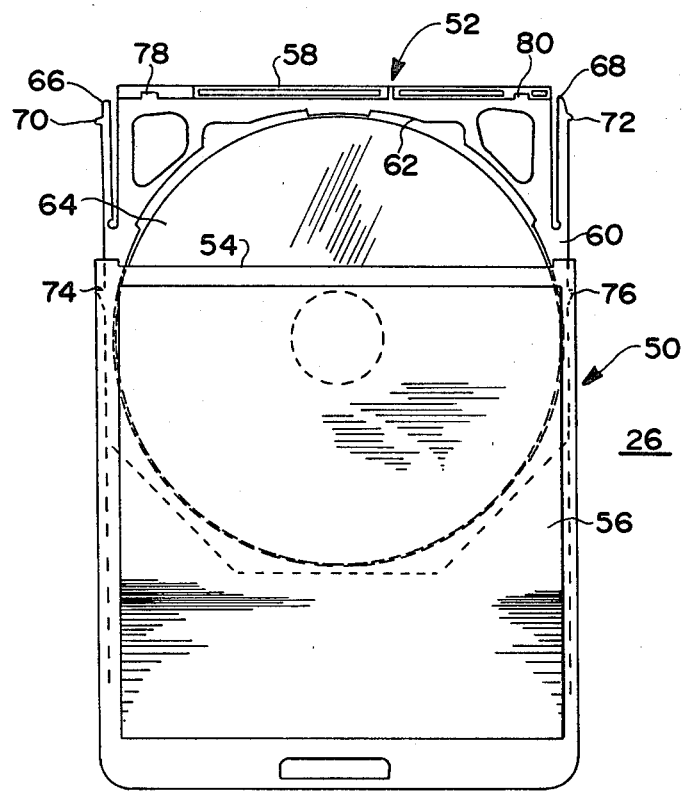
FIG. 2 shows a video disc caddy suitable for use with the player of FIG. 1.
Figure 3:
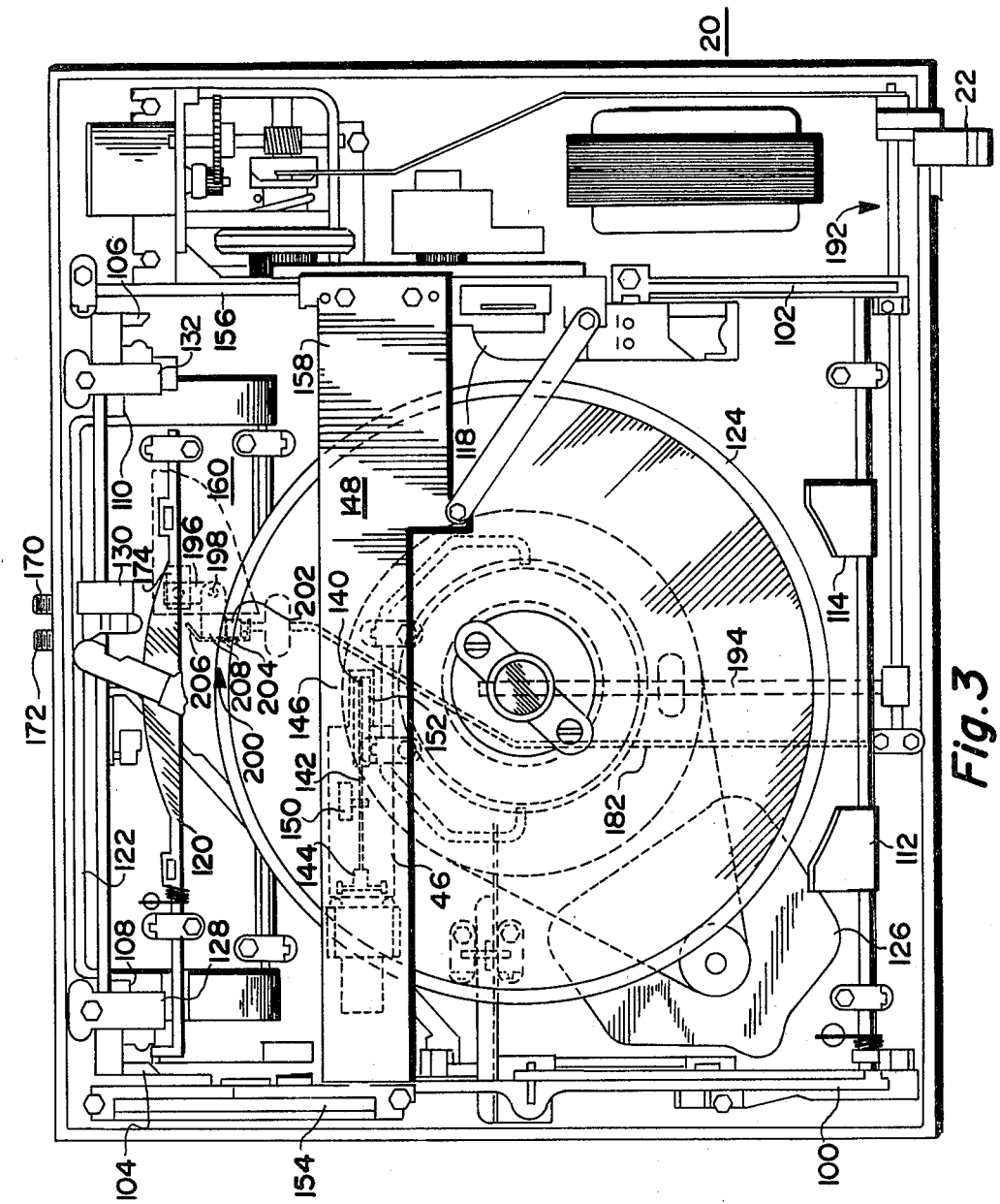
FIG. 3 represents a plan view of the player of FIG. 1 with its cover removed to show the underlying details.

FIG. 2 illustrates the video disc caddy 26. As shown therein, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured record 64. The spine 52 is further provided with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully inserted therein. The spine 52 is provided with cutouts 78 and 80 for selectively receiving a pair of spine gripper members mounted in the player to secure the spine thereto in the manner explained later.

The operation of a record loading/unloading mechanism provided in the player will first be explained in conjunction with FIG. 3. To insert a record, the caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68 for freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a rubber diaphragm 144. The cartridge 46 is placed in a compartment 146 provided in a stylus arm carriage 148, and the carriage lid, not shown, is closed.

A stylus arm lifting/lowering mechanism 150 is mounted in the carriage 148 to selectively lower the pickup stylus 140 through an opening 152 provided in the bottom wall of the carriage to effect record engagement. During playback, the carriage 148 is translated on guide ways 154 and 156 disposed parallel to the caddy side rails 100 and 102 from a starting position at the back of the player toward the front of the player in synchronism with the radially inward motion of the pickup stylus 140. The variations in capacitance between an electrode carried by the stylus 140 and a conductive property of the record 64 are sensed by pickup circuitry 158 to reproduce the stored information on the record. The recovered signals are processed by signal processing circuits 160 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 arrives at the fully inserted position, the front edge thereof engages the carriage 148 to push it back to the starting position at the back of the player, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

The player is provided with an input terminal 170 which is connected to a television antenna (not shown). The player is further equipped with an output terminal 172 for supplying either the antenna signals or the player output signals to a television receiver (not shown) depending upon whether the player is in the OFF mode or in the PLAY or LOAD/UNLOAD mode. When the function lever 22 is in the OFF position, antenna signals at the input terminal 170 are routed by a transfer switch 174 (e.g., a miniature slide switch made by Stackpole Components Co.) to the output terminal 172 for application to the television receiver. When the function lever 22 is in any one of the other modes, the transfer switch 174 blocks the input terminal 172, and feeds the signals at the output of the signal processing circuits 160 to the television receiver via the output terminal 172.

An apparatus 180 for actuating the transfer switch 174, in accordance with the subject invention, will now be described in conjunction with FIGS. 4-7. The switch actuating apparatus 180 comprises an actuating rod 182 which is disposed in a retracted location (FIG. 5), in an intermediate location (FIG. 6) and an advanced location (FIG. 7) in response to the disposition of the function lever 22 in the OFF position, the PLAY position and the LOAD/UNLOAD position respectively. A spring-loaded ball 184 snaps into cutouts 186, 188 and 190 to respectively detent the function lever 22 in the LOAD/UNLOAD position, the PLAY position and the OFF position. The function lever 22 is connected to the actuating rod 182 by means of a linkage 192, shown in FIG. 4, which also operates the turntable lifting/lowering mechanism 194.

Figure 4:
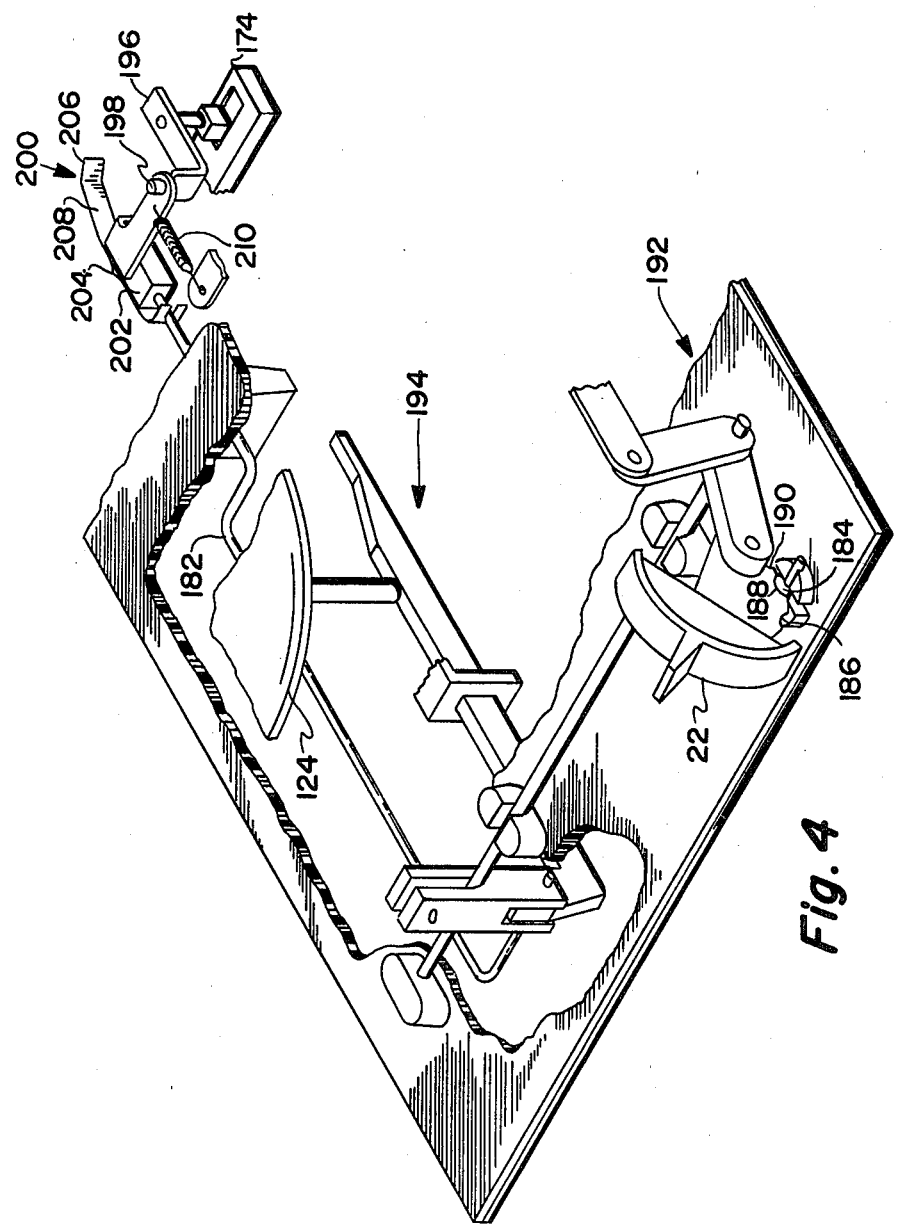
FIG. 4 depicts a perspective view of the instant switch actuating apparatus.
Figure 5:
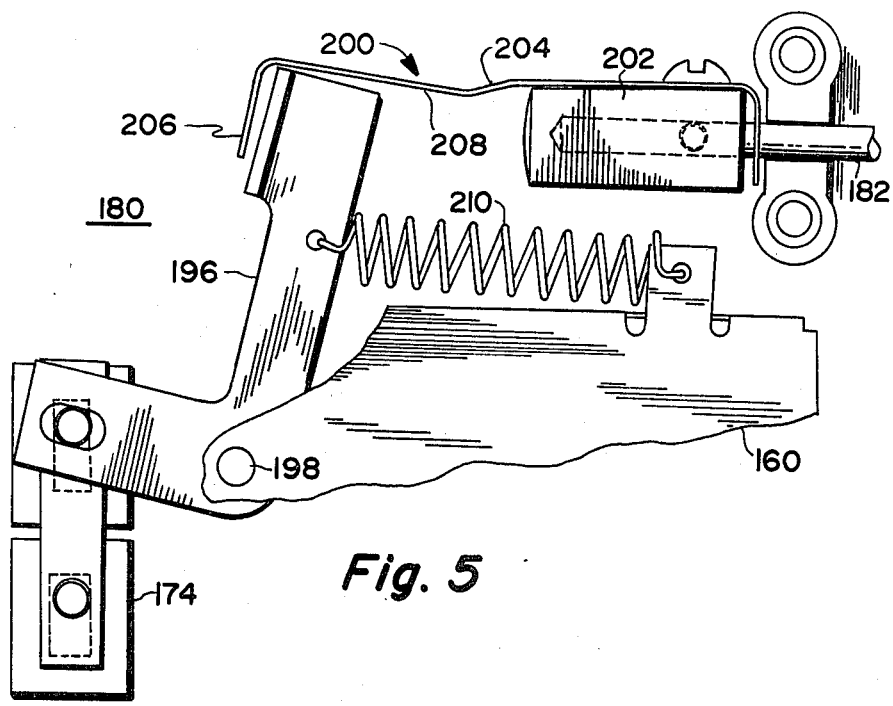
FIGS. 5, 6 and 7 are bottom views of the subject switch actuating apparatus illustrating an operating sequence.
Figure 6:
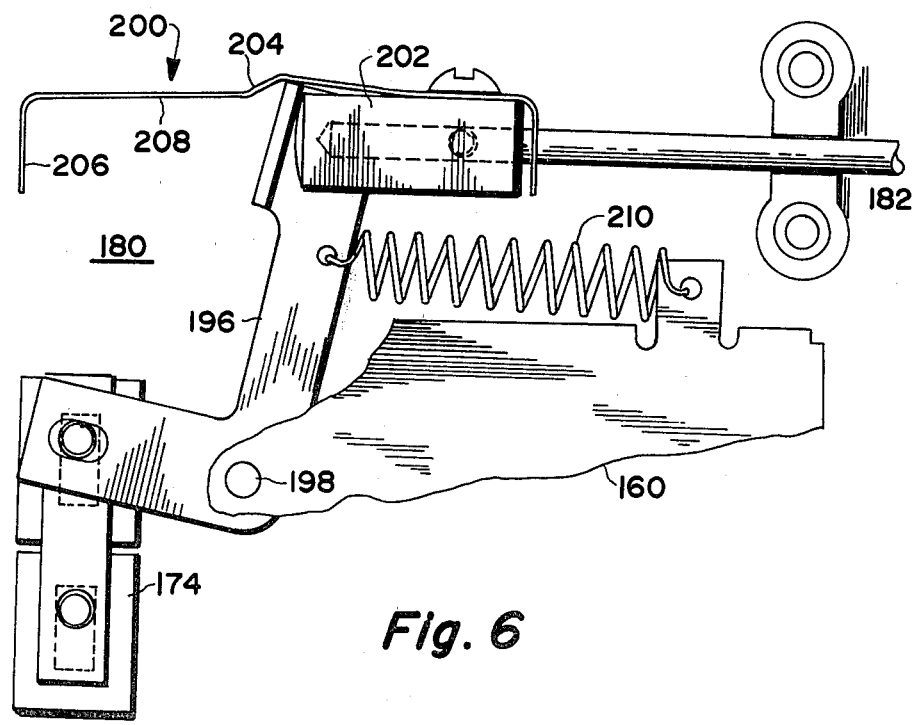
Figure 7:
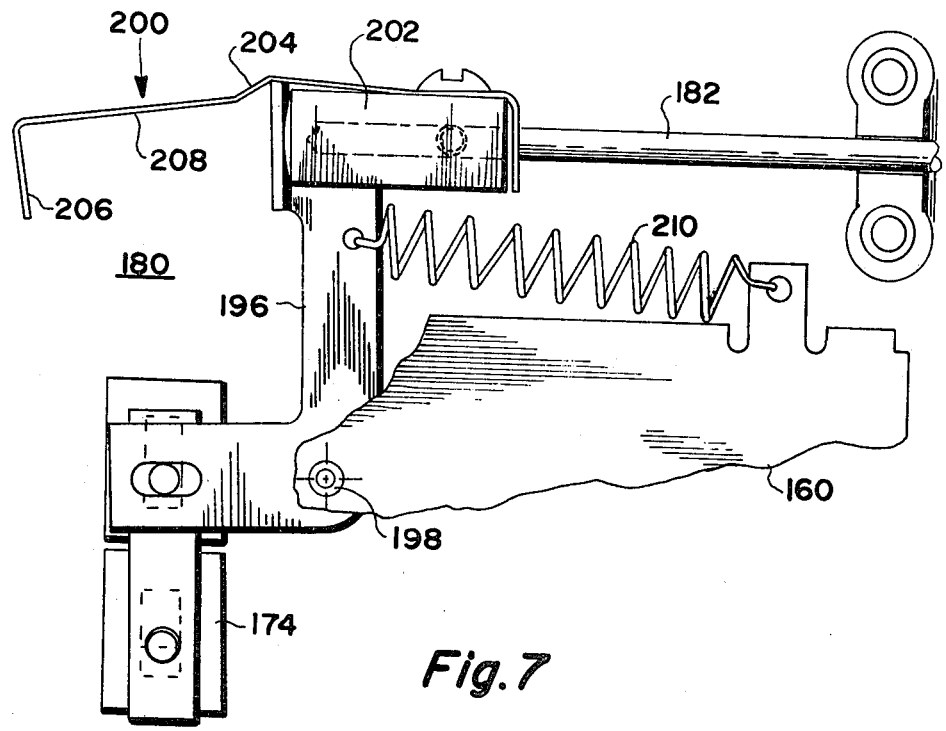

The instant apparatus 180 further includes an actuated lever 196 pivoted about a pin 198 for motion between a first position, shown in FIGS. 4-6, and a second position, shown in FIG. 7. (It will be noted that FIGS. 5-7 are bottom views.) A leaf spring 200 is fixedly secured to a block 202 disposed on the actuating rod. The leaf spring 200 is provided with a crimped portion 204, adjacent to the front end of the block 202, for capturing the actuated lever 196 when the actuating rod 182 is shifted from the retracted position, shown in FIG. 5, to the intermediate position, indicated in FIG. 6. As the actuating rod 182 is further advanced, it displaces the actuated lever 196 to the second position, as illustrated in FIG. 7. In this position of the actuated lever 196, the player is in the OFF mode, the transfer switch 174 is in the position shown in FIG. 7, and the signals from the antenna, at the input terminal 170, are routed to the television receiver via the output terminal 172 bypassing the player signal processing circuitry.

When the function lever 22 is shifted to the PLAY position, the actuating rod 182 is retracted to the intermediate position shown in FIG. 6. The retraction of the actuating rod 182 causes the crimped portion 204 of the leaf spring 200 to pull the actuated lever 196 back to the position indicated in FIG. 6. Thus, when the player is in the PLAY mode, the transfer switch 174 is in the position indicated in FIG. 6, and the signals at the output of the signal processing circuits 160 are fed to the television receiver via the output terminal 172.

Further retraction of the actuating rod 182 to the position shown in FIG. 5, in response to the displacement of the function lever 22 to the LOAD/UNLOAD position, does not disturb the position of the transfer switch 174. The leaf spring 200 slides over the actuated lever 196 to allow overtravel. The bent portion 206 of the leaf spring 200 ensures a continuous engagement between the actuated lever 196 and the leaf spring.

When the actuating rod 182 is advanced, as hereinbefore indicated, to the position shown in FIG. 6, a ramp portion 208 disposed on the leaf spring 200 slides over the actuated lever 196 to allow the crimped portion 204 to seize the actuated lever. A coil spring 210 assists the transfer switch 174 to return to the position shown in FIG. 6 when the function lever 22 is moved from the OFF position to the PLAY position, and furthermore, prevents accidental operation of the transfer switch when the function lever is displaced from the LOAD/UNLOAD position to the PLAY position. It is important to make sure that the force exerted by the coil spring 210, and reflected back through the mechanism, does not overcome the force exerted by the detent 184 on the function lever 22 to accidently shift the function lever from the OFF position to the PLAY position.

What is claimed is:

1. Apparatus comprising:
   (A) an actuated member adapted for motion between a first position and a second position;
   (B) an actuating member subject to disposition at a retracted location, an intermediate location and an advanced location along a path; and
   (C) a leaf spring having one end fixedly secured to said actuating member; said leaf spring further having a detent portion which is spaced from said actuated member when said actuating member is occupying said retracted position thereof; said detent portion releasably capturing said actuated member as said actuating member is advanced to said intermediate location along said path; said capture of said actuated member by said detent portion of said leaf spring causing said actuated member to occupy said first position and said second position in response to disposition of said actuating member at said intermediate location and said advanced location respectively; said leaf spring allowing said actuated member to free from said detent portion as said actuating member is retracted away from said intermediate location; said leaf spring permitting travel of said actuating member between said retracted location and said intermediate location without affecting the position of said actuated member.

2. Apparatus as defined in claim 1 further including a switch coupled to said actuated member, and subject to motion between a set position and a reset position in response to motion of said actuated member between said first position and said second position.

3. Apparatus as defined in claim 1 wherein a crimp is disposed on said leaf spring near said one end thereof to define said detent portion for releasably capturing said actuated member.

4. Apparatus as defined in claim 3 wherein a segment of said leaf spring between the other end thereof and said crimp defines a ramp subject to engagement with said actuated member as said actuating member is advanced to said intermediate location; said engagement between said ramp and said actuated member deflecting said leaf spring away from said actuated member for allowing said crimp to capture said actuated member as said actuating member arrives at said intermediate location.

5. Apparatus as defined in claim 1 further including a function lever coupled to said actuating member for disposing said actuating member in said locations; said apparatus further including means for detenting said function lever in correspondence to each of said retracted, intermediate and advanced locations.

6. Apparatus as defined in claim 5 further including a spring for biasing said actuated member to return to said first position; the force exerted by said biasing spring and reflected back to said function lever through said actuating member being insufficient to overcome the force exerted by said detenting means on said function lever.

7. An antenna transfer switch actuating apparatus comprising:
   (A) an antenna transfer switch adapted to be disposed in a first state and a second state;
   (B) an actuated member coupled to said antenna transfer switch, and adapted for motion between a first position and a second position to respectively dispose said antenna transfer switch in said first and second states;
   (C) an actuating member subject to disposition at a retracted location, an intermediate location and an advanced location along a path;
   (D) means for selectively disposing said actuated member in one of said locations; and
   (E) a leaf spring having one end fixedly secured to said actuating member; said leaf spring having a crimp portion which is spaced from said actuated member when said actuating member is occupying said retracted position thereof; said crimp portion releasably engaging said actuated portion as said actuating member is advanced to said intermediate location along said path; said engagement of said crimp portion with said actuated member causing said actuated member to occupy said first and said second position in response to disposition of said actuating member at said intermediate location and said advanced location respectively; the leaf spring allowing said actuated member to free from said crimp portion as said actuating member is retracted away from said intermediate location; said leaf spring permitting travel of said actuating member between said retracted location and said intermediate location without affecting the position of said actuated member.

8. Apparatus as defined in claim 7 wherein a segment of said leaf spring between the outer end thereof and said crimp portion defines a ramp subject to engagement with said actuated member during advancement of said actuating member to said intermediate location; said engagement between said ramp and said actuated member deflecting said leaf spring away from said actuated member for allowing said crimp portion to capture said actuated member upon arrival of said actuating member at said intermediate location.

9. Apparatus as defined in claim 7 wherein said selectively disposing means comprises a function lever coupled to said actuating member.

10. Apparatus as defined in claim 9 further including means for detenting said function lever in correspondence to each of said retracted, intermediate and advanced locations.

11. Apparatus as defined in claim 10 further including a spring for biasing said actuated member to return to said first position; the force exerted by said biasing spring and reflected back to said function lever through said actuating member being insufficient to overcome the force exerted by said detenting means on said function lever.

* * * * *